United States Patent [19]

Torok

[11] Patent Number: 5,315,198

[45] Date of Patent: May 24, 1994

[54] SYNCHRONOUS MACHINE

[76] Inventor: Vilmos C. Toroh, C. Miles v, 7, 18134 Lidingo, Sweden

[21] Appl. No.: 958,327

[22] PCT Filed: Apr. 24, 1991

[86] PCT No.: PCT/SE91/00293

§ 371 Date: Dec. 16, 1992

§ 102(e) Date: Dec. 16, 1992

[87] PCT Pub. No.: WO91/16754

PCT Pub. Date: Oct. 31, 1991

[30] Foreign Application Priority Data

Apr. 24, 1990 [SE] Sweden .................................. 9001473

[51] Int. Cl.$^5$ ............................................ H02K 21/00
[52] U.S. Cl. ..................... 310/162; 310/156; 310/184; 310/254; 310/261
[58] Field of Search ............... 310/156, 162, 163, 164, 310/269, 261, 198, 180, 181, 254, 154, 184

[56] References Cited

U.S. PATENT DOCUMENTS

| | | | |
|---|---|---|---|
| 5,140,210 | 8/1992 | Shirakawa | 310/156 |
| 5,162,685 | 11/1992 | Yamaguchi et al. | 310/156 |
| 5,170,085 | 12/1992 | Shinto | 310/156 |

FOREIGN PATENT DOCUMENTS

| | | |
|---|---|---|
| 677781 | 7/1939 | Fed. Rep. of Germany . |
| 1226720 | 7/1960 | France . |
| 226749 | 11/1985 | Japan . |
| 8910653 | 11/1989 | PCT Int'l Appl. . |

OTHER PUBLICATIONS

Electric Machinery, by Fitzgerald et al.; pp. 121–133; (no month) 1983; McGraw-Hill, New York, N.Y.

Primary Examiner—R. Skudy
Attorney, Agent, or Firm—Sughrue, Mion, Zinn, Macpeak and Seas

[57] ABSTRACT

A synchronous machine having a stator and a rotor, of which one, preferably the stator, is provided with a three-phase, symmetrical, Y-connected armature winding intended to have a sinusoidal line voltage or a sine-wave supply current, whereas the other, preferably the rotor, carries a field magnet system. The magnetic flux generated in the air gap between the ferromagnetic cores of the stator and the rotor and linked with the armature winding has a density whose mean value, as determined over the axial extension of the air gap, varies along the air gap in its circumferential extension in accordance with a uniform periodic function whose positive and negative half-periods are mirror images of one another and whose period coincides with the extension of two pole pitches of the field magnet system, and whose shape deviates from a purely sinusoidal shape. Within one-half of one positive half-period of the function $f(\alpha, \beta) = 1$ for $0 \leq \alpha \leq \pi/2$ and $f(\alpha, \beta) = \cos(\alpha - \beta) - \sin\beta/1 - \sin\beta$ for $\beta < \alpha \leq \pi/2$, where $\alpha$ is the angle in the circumferential direction of the air gap and varies from 0° to 90° electrical over half of one-half period and $\beta$ is a constant not greater than about 40° electrical.

11 Claims, 7 Drawing Sheets

A=0.0; 384.0  B=5.12;-404.48  C=-240.64;-317.44  D=215.04; 317.44 mV

1

SYNCHRONOUS MACHINE

BACKGROUND OF THE INVENTION

The present invention relates to a synchronous machine of the kind set forth below.

The large majority of such synchronous machines are rotary machines, the rotor of which is normally cylindrical. Accordingly, the invention will be described primarily with reference to such machines. It will be understood, however, that the invention can also be applied to rotary machines which are equipped with rotors of other configurations, for instance disc-like rotors or conical rotors, and also to linear machines.

According to conventional techniques, it is customary in a synchronous machine, the armature winding of which shall have a sinusoidal terminal or line voltage, or, in the case of a motor, is supplied with a sinusoidal terminal current, to design the armature winding, which is normally mounted on the stator of the machine, and the field magnet system, which is normally mounted on the rotor, such that the density of the flux which exists in the air gap between the stator and the rotor, and which is linked with the armature winding, is distributed sinusoidally as seen along the direction of movement of the two relatively movable parts of the machine, i.e. over the circumference in the case of a conventional rotary machine. This applies irrespective of whether the field system comprises salient field poles provided with permanent magnets or electromagnetic field coils, or comprises a distributed field winding mounted on a ferromagnetic iron core, for instance on a cylindrical rotor core. In the case of machines provided with salient field poles, it is sometimes possible to tolerate some deviation from the desired sinusoidal distribution of the air-gap flux-density, namely such deviations as those caused by deviations in the shape of the permanent magnets or the pole shoes from the theoretically ideal shape, which substantially simplify the manufacture of the permanent magnets or the pole shoes.

SUMMARY OF THE INVENTION

The object of the present invention is to provide a synchronous machine of the kind described in the introduction which has a higher induced voltage, and consequently a higher rated output than earlier known synchronous machines of this kind that are constructed in a conventional manner.

This object is achieved in accordance with the invention, in a synchronous machine, by dispensing with the earlier desired sinusoidal distribution of air-gap flux-density and instead employing a flattened distribution function for air-gap flux-density.

BRIEF DESCRIPTION OF THE DRAWINGS

The invention will now be described in more detail with reference to the accompanying drawings, in which.

DETAILED DESCRIPTION OF THE PREFERRED EMBODIMENTS

Figure 11:
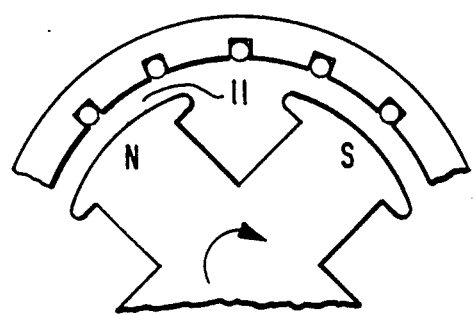
FIG. 11 shows a portion of a typical rotor/stator air gap.

In a synchronous machine in which an armature winding is mounted conventionally in slots, normally in the stator core of the machine, there is induced at a given rotational speed in each coil side, i.e. in each active part of the winding, a voltage whose time curve has the same appearance as the spatial distribution of the density of the airgap flux linked with the coil side. Generally, there exists a highest permitted or highest possible value for the flux density in the air gap which cannot be exceeded for practical constructional reasons, such as particularly the saturation of the teeth of the slotted stator core. In the case of a conventionally designed machine in which sinusoidal distribution of the air-gap flux-density is desired, there is a corresponding limitation on the amplitude of the induced voltage. A typical rotor/stator air gap is shown at 11 in FIG. 11.

Figure 12:
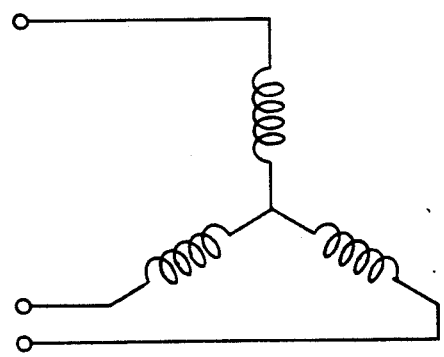
FIG. 12 shows a symmetrical, three-phase Y-connected armature winding.

The present invention is based on the realization that in the case of a three-phase, symmetric, Y-connected armature winding, as shown in FIG. 12, the phase voltage can contain a third harmonic and higher harmonics related thereto (9th, 15th, 21st, etc.), without influencing the line or terminal voltage of the winding. This enables the armature winding and the field magnet system of the machine to be constructed in a manner such that spatial distribution of the density of the air gap flux linked with the armature winding in the direction of relative movement of the two relatively movable parts of the machine, i.e. normally in the circumferential direction of the air gap in the case of a rotary machine, will not be sinusoidal but can be allowed to include a third higher harmonic, and wave harmonics related thereto, in addition to a sinusoidal fundamental wave. This enables the use of an air-gap flux-density distribution function which contains a sinusoidal fundamental wave whose amplitude is greater than the maximum amplitude of the distribution function, i.e. for air-gap flux-density, and which therefore provides an induced fundamental voltage of corresponding high amplitude, without exceeding the air-gap flux-density which can be accepted for constructional reasons.

Such a more advantageous distribution, which deviates from a precise sinusoidal form, as seen in the direction of relative movement of the two relatively movable parts of the machine, i.e. in the circumferential direction of the air gap in a conventional machine, of the mean density of the air-gap flux linking the armature winding of the machine, as seen in a direction perpendicular to said direction of movement, i.e. as seen in the axial direction of the air gap in a conventional rotary machine, shall exhibit, in accordance with the present invention, a variation corresponding to a uniform periodic function:

$$f(\alpha,\beta),$$

whose positive and negative half-periods are mirror images of one another and whose period coincides with the extension of two pole pitches of the field magnet system in said direction of relative movement, and whose shape is such that one-half of a positive half-period of the function can be defined in accordance with the following:

$$f(\alpha,\beta) = 1 \text{ for } 0 \leq \alpha \leq \pi/2 \text{ and,}$$

$$f(\alpha, \beta) = \frac{\cos(\alpha - \beta) - \sin \beta}{1 - \sin \beta} \text{ for } \beta < \alpha \leq \pi/2,$$

where $\alpha$ is the extension along the air gap in said direction of relative movement and varies from 0 to $\pi/2$, i.e. from 0° to 90° electrical, over one-half of a half-period of the function, and $\beta$ is a constant.

Figure 1:
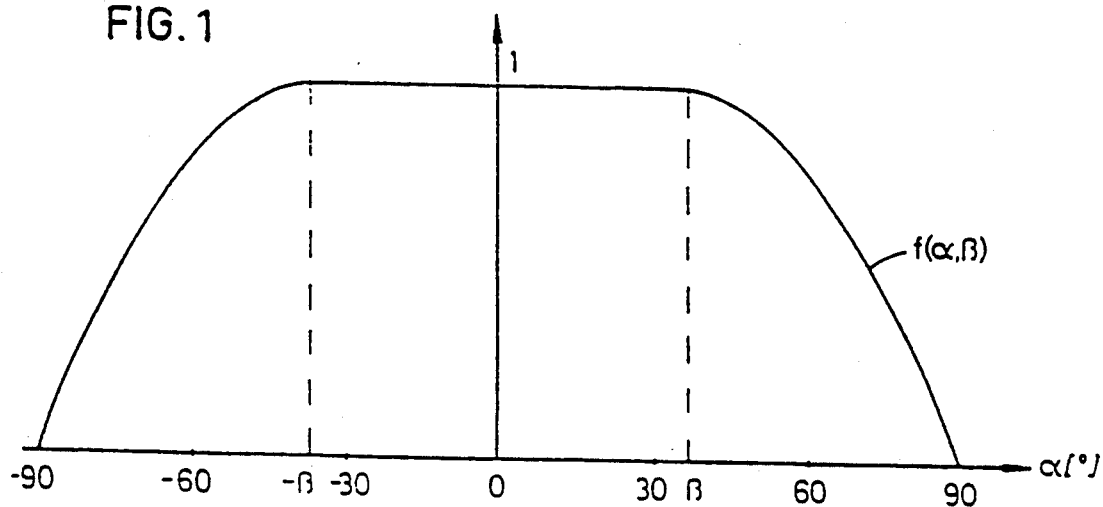
FIG. 1 is a diagram illustrating the inventive function used to vary the mean value of the air-gap flux along the direction of relative movement of the two relatively movable parts of the machine.

FIG. 1 illustrates the shape of a positive half-period of this function, which thus has a constant amplitude around the center point of the half-wave, i.e. within the range $-\beta \leq \alpha \leq \beta$, and is terminated sinusoidally on both sides of this constant interval. This function has a sinusoidal fundamental wave, whose amplitude is higher than the amplitude of the function, but which also contains a third wave harmonic and higher harmonics related thereto which, as before mentioned, will not contribute to the line or terminal voltage of an armature winding in a machine provided with a symmetric three-phase Y-connected armature winding, and can therefore be ignored, and in addition thereto also harmonics of other orders, particularly the 5th and 7th harmonics.

Figure 2:
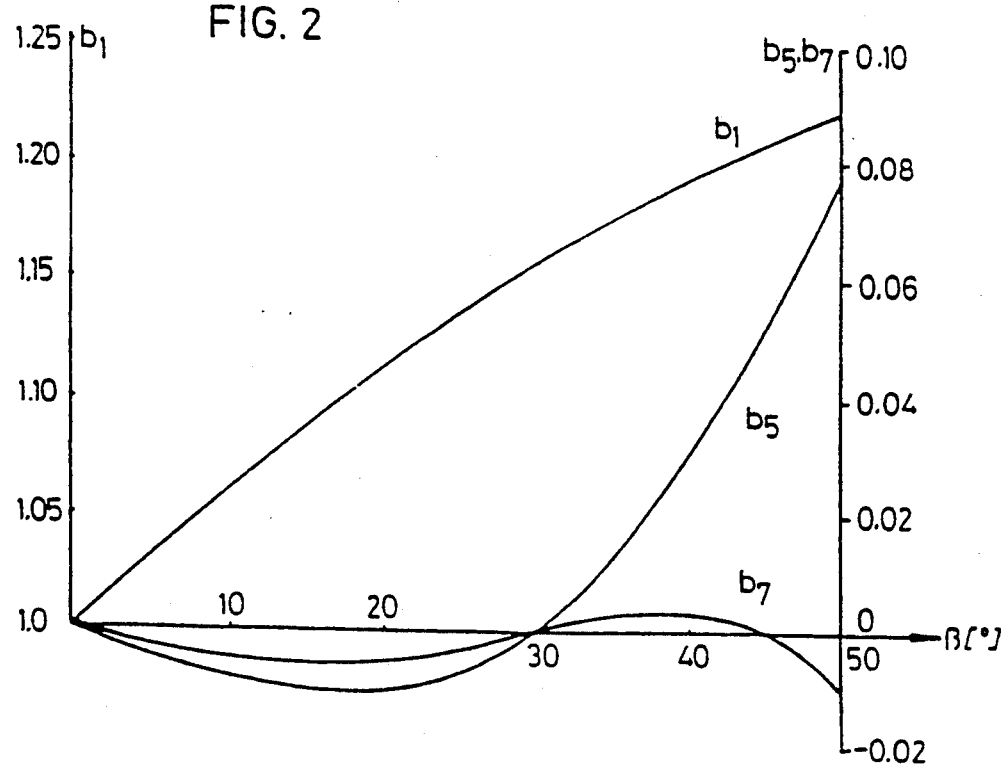
FIG. 2 is a diagram which illustrates the amplitude of the fundamental or dominant wave and certain of the harmonic or superimposed waves of the function according to FIG. 1.

The diagram in FIG. 2 shows the amplitude $b_1$ for the fundamental wave and also the amplitudes for the 5th harmonic, $b_5$, and the 7th harmonic, $b_7$, as a function of the value of the constant $\beta$ expressed in electrical degrees.

As will be seen from this diagram, there is only one value of $\beta$ different from 0, namely $\beta = \pi/6$ (30° electrical), for which the above-defined function $f(\alpha,\beta)$ lacks all harmonics other than the third harmonic and harmonics related thereto (9th, 15th, 21st, etc.). This special function will hereinafter be referred to as $$\text{sinhex}(\alpha) = f(\alpha, \pi/6)$$

wherein "sinhex" is a designation coined for the present purpose. As far as is known, the function in question has not earlier been described or used in any context. This function has a fundamental wave having an amplitude which is $2/\sqrt{3} = 1.155$ times greater than a pure sine wave whose amplitude is the same as the amplitude of the function. Consequently, when the air-gap flux-density is distributed according to the sinhex function, the induced voltage will be 15.5% greater in a similar armature winding than when the flux density is distributed according to a pure sine function, with other conditions being equal. The mean value of a half-period of a sinhex-distributed flux density is 20.8% higher than a half-period of a sinusoidally flux density of the same amplitude, i.e. only marginally lower (4.6%) than that corresponding to a sine wave having the same amplitude as the fundamental wave of the sinhex-function.

As will be seen from FIG. 2, the 5th and 7th harmonics remain small, even in respect of the $\beta$-values which deviate from $\pi/6$. The amplitudes of the 5th and 7th harmonics will be lower than 2% of the amplitude of the fundamental wave, provided that $\beta$ is smaller than 40° electrical, i.e. about $0.22\pi$. It is therefore possible, in the majority of cases, to use a function according to the aforegoing whose $\beta$-value differs from $\pi/6$, without incurring serious drawbacks. However, as will be seen from FIG. 2, the amplitude $b_1$ of the fundamental wave decreases with decreasing $\beta$-values. Thus, in the case of $\beta$-values below $\pi/6$, the amplitude $b_1$ of the fundamental wave is smaller than the amplitude at the optimal value $\beta = \pi/6$, and at the same time harmonics of the 5th and 7th orders occur. Consequently, $\beta$-values which are below $\pi/6$ will not afford any advantage in the majority of cases, unless it is essential to maintain within given limits the increase in the total air-gap flux obtained when using the inventive function. On the other hand, it may be advantageous to use an inventive function having a $\beta$-value which is greater than $\pi/6$, since this will result in a still greater fundamental wave amplitude $b_1$, without the amplitudes of the 5th and 7th harmonics becoming particularly high. Consequently, a function having a $\beta$-value of up to 40°, or at least up to 35° electrical, can be used in many instances to no serious disadvantage caused by the 5th and 7th harmonics included in the function.

The armature winding, i.e. generally the stator winding, of an electrical machine is generally constructed such that the harmonic voltage components induced as a consequence of harmonics in the distribution function of the air-gap flux are much smaller in relation to the fundamental voltage component than the amplitude of the wave harmonics in relation to the fundamental wave in the flux distribution function, i.e. the winding factor for the harmonics is much smaller than for the fundamental wave. Factors which contribute to this relative suppression of the harmonic voltage components are, inter alia, as follows, as described in more detail further on:

The slot-mounted armature winding, normally in the stator, has a number of coil sides, i.e. it is placed in a number of slots, for each field pole and phase which is greater than 1.

The coil sides, i.e. the slots, extend obliquely in relation to the direction of relative movement of the two machine parts, i.e. normally obliquely in relation to the circumferential direction of the air gap.

In a machine having a heteropolar field magnet system, the pole arc is smaller than the pole pitch;

the field magnets are displaced in the direction of relative movement of the two relatively movable parts of the machine, i.e. normally in the circumferential direction of the air gap, relative to those positions which correspond to a uniform distribution of the field poles in said direction;

the side flanks of the pole faces extend obliquely in relation to the direction of relative movement of the two relatively movable machine parts;

the pole faces are bevelled or chamfered;

the pole shoes have a curved shape;

The air-gap thickness, i.e. the distance between the ferromagnetic cores of the relatively movable machine parts, varies along the gap in the direction of relative movement of said machine parts;

in a field magnet system which has permanent-magnetic field poles, the thickness of the permanent magnets varies in the direction of relative movement between the machine parts.

However, the 5th and 7th wave harmonics in the induced voltage are significant to the so-called load-dependent torque pulsations in the case of permanently magnetized, synchronous servo motors of the sinusoidal type, motors which are intended to be supplied with sine-wave current. Six superimposed torque-pulsation periods are normally found for each electrical period. These torque-pulsation periods create undesirable disturbances in the servo system. It can be proven mathematically, however, that torque pulsations of six-fold periodicity can be avoided, despite the presence of both 5th and 7th harmonics in the induced voltage. All that is necessary in order to achieve this, is for the amplitudes of the harmonics to be mutually equal but counterdirectional to one another. This provides a usable guideline for assessing the various measures that can be taken in order to reduce the 5th and 7th harmonics in the induced voltage of a machine. This also provides a possibility of checking the balance between the 5th harmonic and the 7th harmonic in a technically simple manner. The aforesaid requirement implies that the path of the statorvoltage vector, as measured by means of a Vector-Visualizer instrument, does not present any "hexagonalism".

Generally speaking, there exist several different ways in which to achieve a distribution of the density of the air gap flux linked with the armature winding in accordance with the inventive function which deviates from a purely sinusoidal distribution.

The most obvious method, at least theoretically, is to construct the machine in a manner such that the air-gap thickness, i.e. the distance between the two relatively movable ferromagnetic cores of the machine parts, will vary in the direction of relative movement between the two machine parts in accordance with the desired function, whereas the active parts of the armature winding, i.e. its coil sides, extend perpendicular to the direction of relative movement. Such an embodiment can be used both with machines that have permanent-magnetic field poles and with machines that have salient electromagnetic field poles provided with coils, in which latter case the pole-shoes of the poles are provided with pole faces which are spaced at varying distances from the surface of the ferromagnetic core of the other machine part, in accordance with the desired function. This method may, of course, also be applied to a machine whose magnet system comprises a distributed field winding which is placed in slots in the ferromagnetic core of the machine-part concerned.

Figure 3:
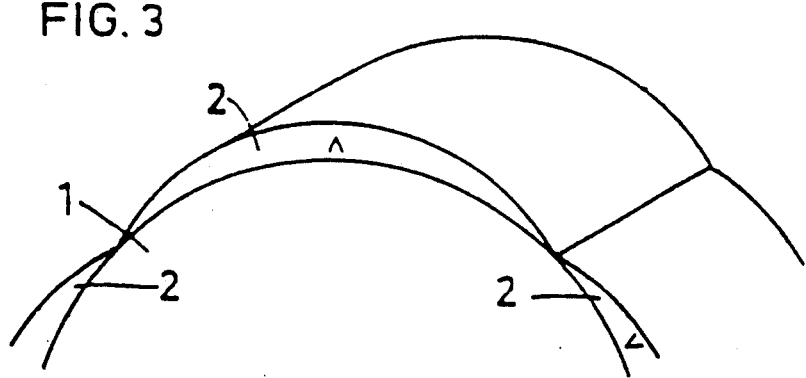
FIG. 3 illustrates schematically one possible configuration of the permanent magnets of a machine provided with permanently-magnetic field poles in accordance with the invention.

In the case of a machine whose field magnet system has the form of permanent-magnetic field poles, it is also conceivable to achieve the desired distribution profile of the air-gap flux-density by configuring the permanent magnets with a thickness which varies in accordance with the desired function. This is illustrated schematically, and by way of example, in FIG. 3 which illustrates in perspective part of a rotor comprising a cylindrical ferromagnetic core 1 that has mounted on the periphery thereof permanent magnets 2 whose thicknesses vary in the circumferential direction of the air gap. It is assumed here that the active parts of the armature winding, the stator winding, the respective coil sides, and also the side-flanks of the permanent magnets 2 extend axially, i.e. perpendicularly to the circumferential direction of the air gap and, accordingly, perpendicularly to the direction of relative movement between the two machine parts. It shall be noted in this context that from the aspect of magnetic flux, the permanent magnets 2 are comparable with the air gap, and hence the thickness of the air gap is, in reality, constant in both the axial and circumferential directions, despite the varying thickness of the permanent magnets. Permanent magnets of such varying thickness are, however, relatively difficult and expensive to produce in practice.

Since the interesting parameter is the voltage induced in the active parts of the armature winding, i.e. its winding sides, it will be seen that it is the mean value of the air-gap flux linked with the armature winding which shall show a variation in accordance with the aforesaid function along the air gap in the direction of relative movement between the two machine parts, this mean value being determined over the active length of the air gap in a direction perpendicular to the direction of relative movement of the two machine parts. Thus, when using an air gap of constant thickness, i.e. constant distance between the ferromagnetic cores of the two machine parts, and for example permanent-magnet field poles of constant thickness, it is possible to achieve the desired distribution of the density of the air-gap flux linked with the armature winding, by an appropriate construction of the armature winding in combination with an appropriate configuration of the extensions of the field poles in the circumferential and axial directions.

Figure 4:
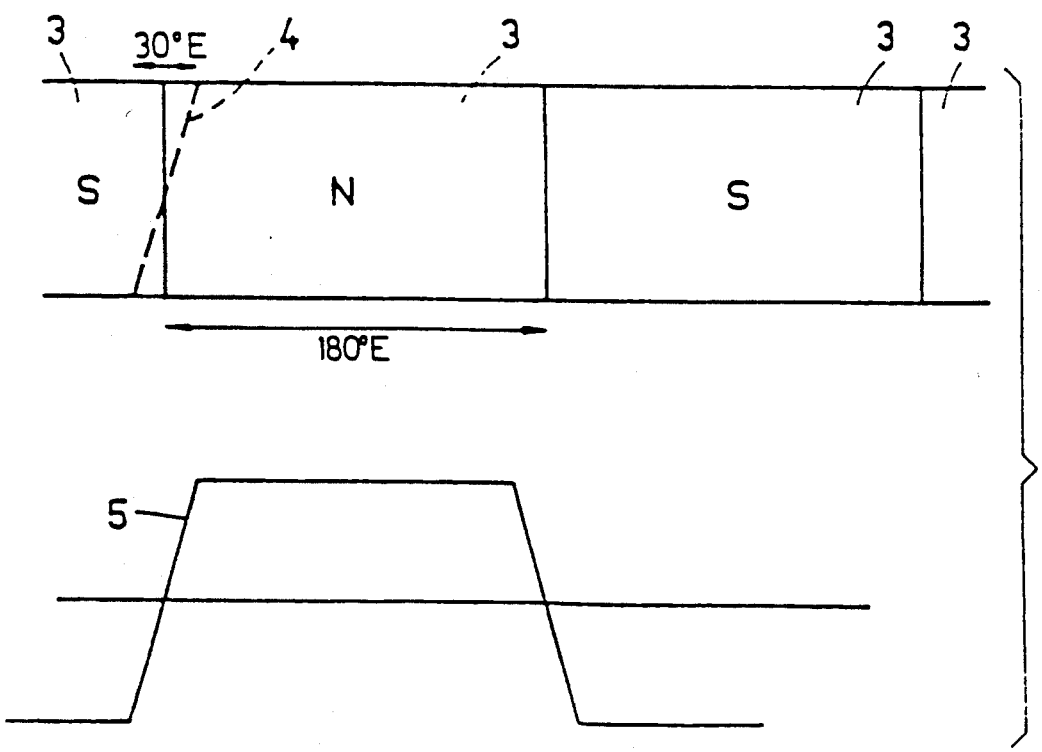
FIGS. 4, 5, 6a–6d and 7a–7c illustrate schematically conceivable constructions of the field magnet system and the armature winding of an inventive machine, particularly a machine in which the field magnet system comprises permanently-magnetic field poles.

FIG. 4 illustrates schematically and by way of example an rotary machine which has a constant air gap and in which the field magnet system comprises rectangular permanent magnet poles 3 of uniform thickness which have a circumferential extension corresponding to one-half pole-pitch, whereas the armature winding, i.e. the stator winding, is placed in skewed slots 4 with a skew angle of 30° electrically and with one slot, i.e. one coil side, for each phase and pole, The mean value of the density of the air-gap flux linked with the armature winding will therewith vary in the circumferential direction of the air gap, in accordance with the trapezoidal wave 5.

Figure 5:
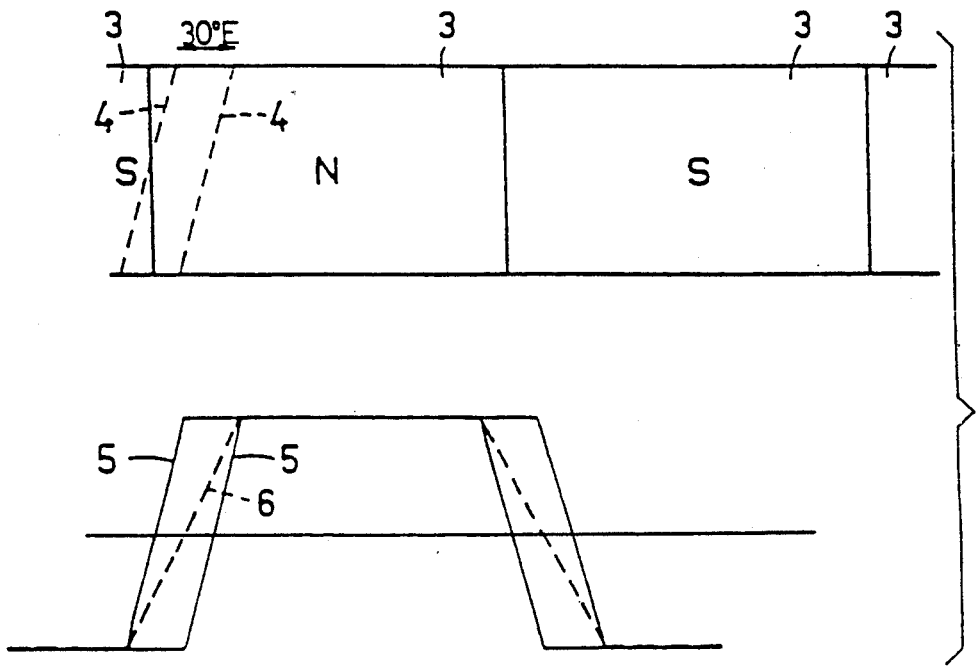

If in a machine having a similarly constructed permanent magnetic field system, the armature winding (i.e. the stator winding) is placed in two oblique slots 4 per pole and phase, as illustrated schematically in FIG. 5, the mean value of the air-gap flux-density linked with the armature winding will vary in the circumferential direction of the air-gap in accordance with the trapezoidal wave 6 illustrated in broken lines, this wave constituting a consolidation of the two trapezoidal waves 5 applicable to each of the two coacting coil sides.

Figure 6:
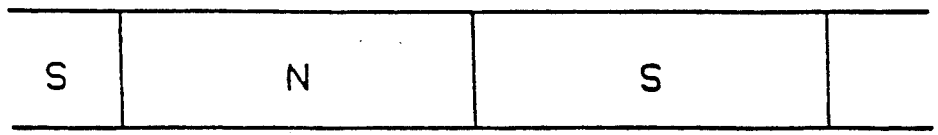
Figure 6:
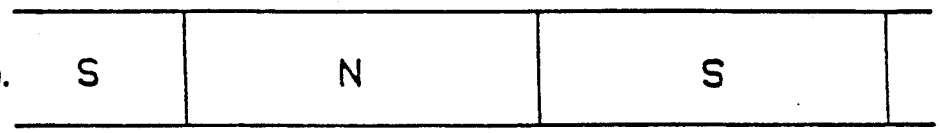
Figure 6:
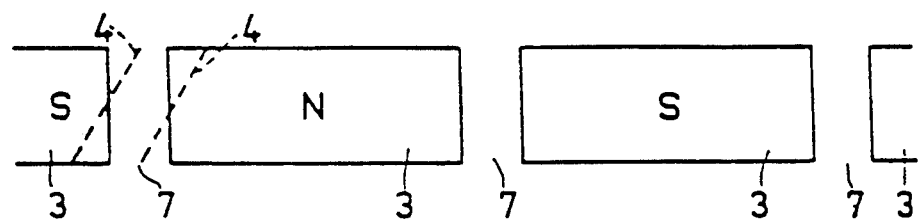
Figure 6:
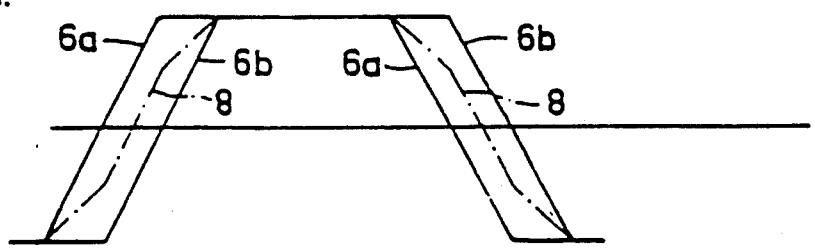

If in a machine having an armature winding constructed in accordance with FIG. 5, i.e. placed in two slots per pole and phase slewed at 30° electrical, the rectangular permanent magnet field poles 3 of uniform thickness are instead formed with a circumferential extension which is less than half the pole-pitch, pole gaps 7 will occur between the field poles 3 in the manner illustrated schematically in FIG. 6c. In this case, the mean value of the density of the air-gap flux linked with the armature winding will vary along the circumferential direction of the air gap in accordance with the trapezoidal waveform 8 with bevelled corners shown in chain lines in FIG. 6d. The width of the bevels corresponds to the width of the pole gaps 7. This will be understood when the permanent-magnet field pole arrangement illustrated in FIG. 6c is considered as a superposition of two permanent- magnet field pole arrangements according to FIG. 5 with field poles of half strength displaced relative to one another in a circumferential direction through a distance corresponding to the size of the pole gap 7, as illustrated in FIGS. 6a and 6b. Thus, the distribution curve represented by waveform 8 in FIG. 6d constitutes half the sum of two distribution curves 6 according to FIG. 5 displaced relative to one another in accordance with the size of the pole gap 7. These two distribution curves 6a and 6b are shown in full lines in FIG. 6.

Figure 7A:
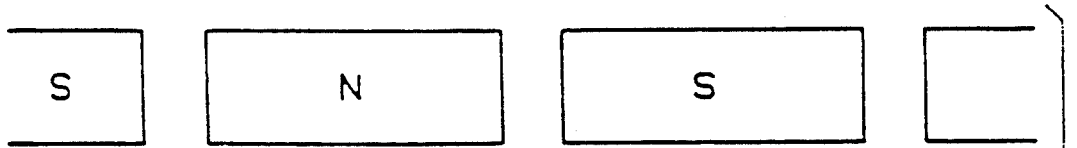
Figure 7B:
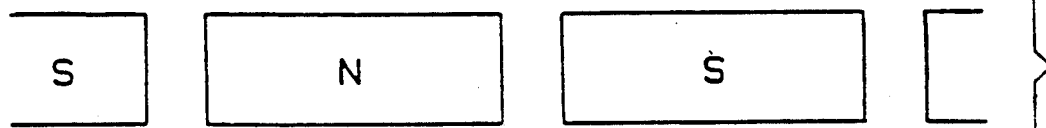
Figure 7C:
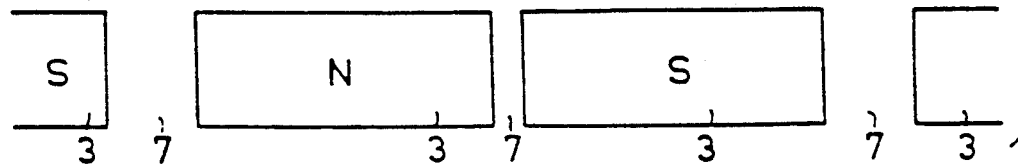

A further refinement with respect to the shape of the distribution curve can be achieved by displacing circumferentially the field poles of a permanent-magnet field pole arrangement alternately in one and the other direction from the positions corresponding to a uniform distribution of the field poles, so that the pole gaps 7 will be alternately narrow and broad, in the manner illustrated schematically in FIG. 7c. Such a permanent-magnet field pole arrangement corresponds to the superpositioning of two permanent-magnet field pole arrangements with field poles of half the strength and displaced in relation to one another through a distance smaller than the width of one pole gap. FIGS. 7a and 7b illustrate both of these imaginary field pole arrangements in which superpositioning results in the field pole arrangement illustrated in FIG. 7c. An advantage is afforded when the poles are displaced through a distance corresponding to one-half of the slot-pitch of the armature winding.

Figure 8A:
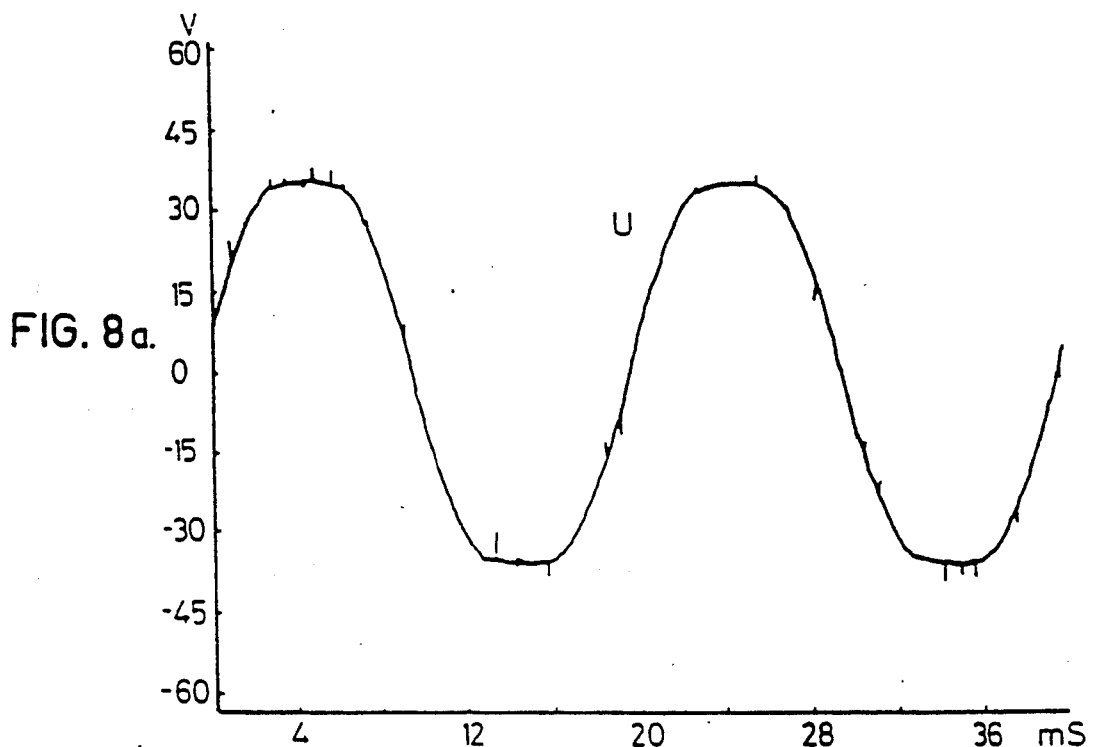
FIGS. 8a and 8b are diagrams which illustrates the measured induced phase voltage and the measured line voltage respectively of the armature winding in an inventive machine constructed as illustrated in FIG. 7.
Figure 8B:
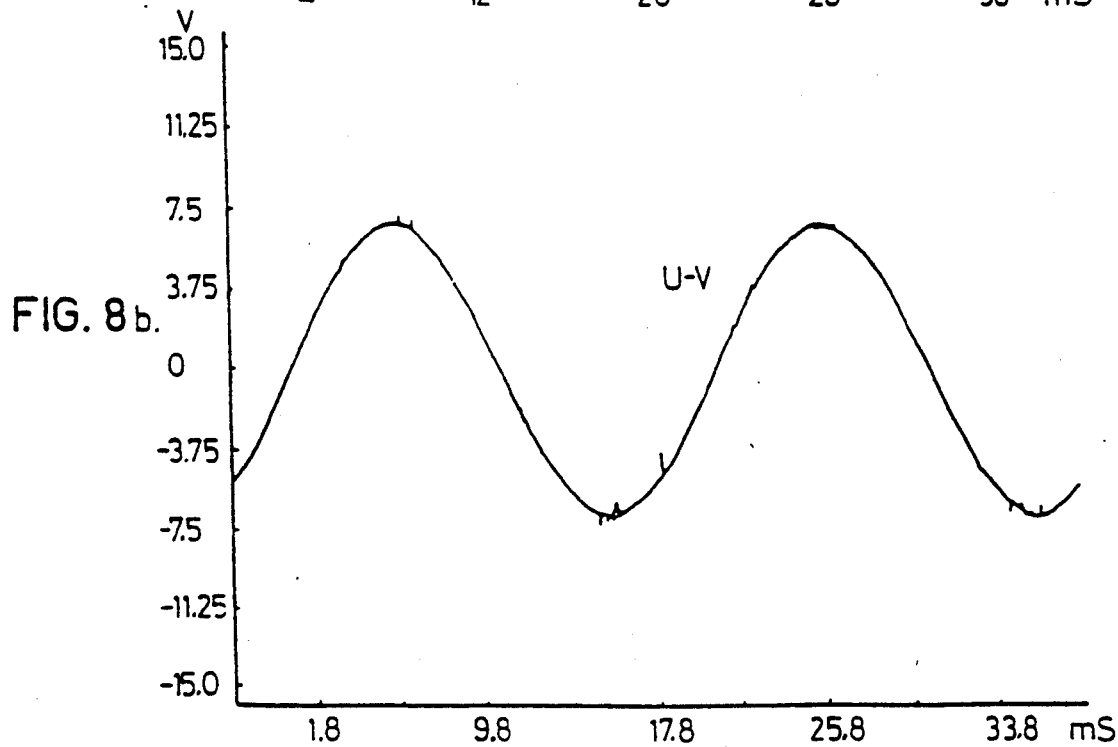

FIG. 8a illustrates the measured induced phase voltage in the armature winding of a machine provided with a permanent-magnet field pole arrangement according to FIG. 7c, whereas FIG. 8b illustrates the measured terminal or line voltage of the armature winding. The phase voltage according to FIG. 8a has a time curve which is approximately of sinhex-shape, whereas the line voltage according to FIG. 8b has an approximately sinusoidal shape.

Figure 9:
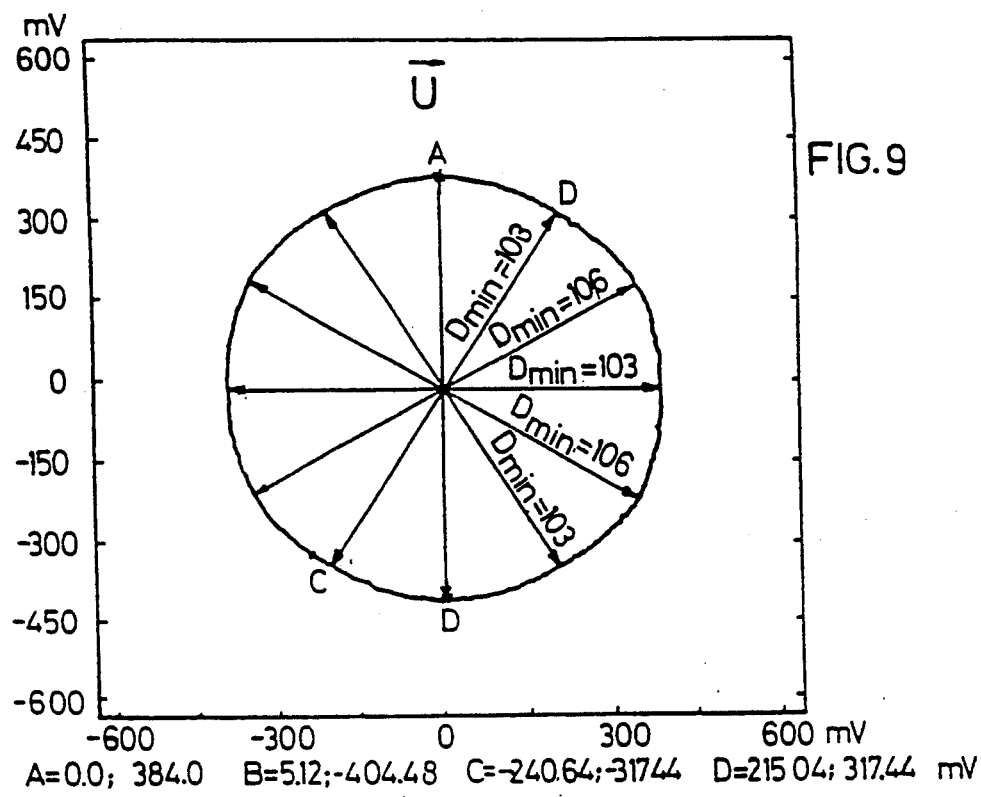
FIG. 9 is a diagram which illustrates the path of the voltage vector for the same machine, as measured with the aid of a vector-visualizing instrument.

FIG. 9 illustrates the voltage vector path in the same machine, as measured with a Vector-Visualizer instrument. As seen from the Figure, this path has a certain, but small degree of hexagonalism, which is a sign that imbalance remains between the 5th harmonic and the 7th harmonic in the line voltage. This imbalance can be eliminated, however, by adjusting the width of the field poles 3, i.e. their extension in the circumferential direction of the air gap, in the field pole arrangement illustrated in FIG. 7c. It can be shown mathematically that the imbalance between the 5th harmonic and the 7th harmonic in the induced voltage, and therewith the hexagonalism of the voltage vector path, is eliminated when the pole width is 147.6° electrical. When the field poles in the field pole arrangement according to FIG. 7c have such width, the induced phase voltage obtains almost a precise sinhex-form, under the conditions concerning the displacement of the field poles and the construction of the armature winding described with reference FIG. 7.

It will be seen from the aforegoing that the same result concerning the distribution in the circumferential direction of the air gap of the mean density of the air-gap flux linked with the armature winding, as described with reference to FIGS. 4–7, can also be achieved with an armature winding which is placed in straight slots, i.e. an armature winding whose active parts or coil sides extend perpendicularly to the circumferential direction of the air gap, when the permanent-magnet field poles are instead provided with oblique or skewed side edges, the skew angle of which corresponds to the earlier assumed skew angle of the armature winding slots. It is both difficult and expensive, however, to produce such skewed permanent-magnet field poles with the present-day techniques.

Figure 10:
FIGS. 10a–10c illustrate schematically a further conceivable construction of the field magnet system in an inventive machine, particularly in a machine having salient field poles with electromagnetic field coils.
Figure 10:
Figure 10:
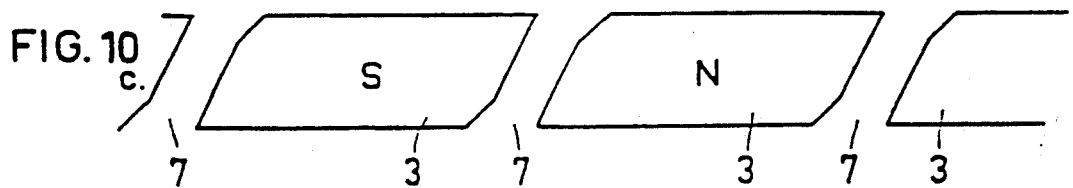

On the other hand, no such difficulties are experienced when configuring the pole shoes in machines that have electromagnetic field poles with pole shoes which correspond to the permanent magnets of a permanent-magnetic field magnet system. In the case of such a machine, the armature winding can thus be placed in straight slots, i.e. with the active winding parts or coil sides extending perpendicularly to the circumferential direction of the air gap, while skewing the pole shoes on the electromagnetic coil-provided field poles and providing intermediate pole gaps such as to obtain the desired function for the mean density of the air-gap flux linked with the armature winding. Instead of displacing the field poles alternately in one or the other direction, so as to obtain alternately large and small pole gaps, as described with reference to FIG. 7, the same result can be obtained by bevelling or chamfering the corners of the pole shoes, in the manner illustrated schematically in FIG. 10c. The fieldpole arrangement illustrated in FIG. 10c can be considered as a superpositioning of the field pole arrangements illustrated in FIGS. 10a and 10b, where each field pole has half the strength of each field pole in FIG. 10c.

In the case of electromagnetic field poles provided with coils, it is also conceivable to use pole shoes which have a curved contour and which are able to provide the desired distribution function for the density of the air-gap flux still more precisely.

It will be understood, however, that in principle there is nothing to prevent the use of an armature winding which is placed in skewed slots in a machine having electromagnetic field poles with coils, and to construct and position the pole shoes of the field poles in accordance with that described above with reference to and illustrated in FIGS. 4–7.

In the case of a synchronous machine whose field magnet system comprises a distributed field winding on a cylindrical ferromagnetic core, i.e. normally a machine having a cylindrical rotor and therewith a constant air gap, the mean density of the air-gap flux can be distributed in accordance with the desired function according to the present invention when the field winding has a current density, or ratio between the total current per slot and the slot pitch, which varies in the circumferential direction of the air gap in accordance with a function which is proportional to the derivative of the afore-described desired function for the variation of air-gap flux-density. Although such a current density of the field winding can only be achieved precisely with a winding that is not mounted in slots, a very good approximation can be achieved with a slot-placed winding, by varying the slot depth and/or the slot pitch along the air-gap periphery.

The invention has been described and discussed in the afore-going with reference to heteropolar machines in which the air-gap field and the air-gap flux vary around a zero mean value. The invention can also be applied, however, in homopolar machines, for instance machines having a premagnetized reluctance system. This will be understood when considering that the voltage induced in a winding is solely dependent on the change of the flux linked with the winding and is independent of the actual size of the flux itself. Thus, in the case of a machine of this kind, the mean density of the air-gap flux linked with the armature winding shall vary around a value different from zero in accordance with the desired inventive function. In the case of a homopolar machine having a premagnetized reluctance system, the permanent field poles with one polarity are replaced with reluctance poles of the same polarity, while the permanent magnet field poles of the opposite polarity are replaced with openings, i.e. large air gaps, and the pole gaps between mutually adjacent permanent magnet field poles are replaced by parts with air gaps which are greater than at the reluctance poles and which are such that the flux density in said parts, as a result of the premagnetization, are equal to the mean value of the flux density caused by the premagnetization at the reluctance poles and the flux density caused in said openings with large air gaps, i.e.

$$B_1 = \frac{B_0 + B_2}{2},$$

where $B_1$ is the flux density created by the premagnetization in the parts corresponding to the pole gaps between two mutually adjacent permanent magnet field poles;

$B_0$ is the flux density created by the premagnetization in the openings with a large air gap and corresponding to the permanent magnet field poles of the opposite polarity; and $B_2$ is the flux density of the reluctance poles created by the premagnetization and corresponding to the permanent magnet field poles of the first polarity.

I claim:

1. A synchronous machine including two relatively movable parts, each having a respective ferromagnetic core and separated by an air-gap, wherein one of said parts is provided with a symmetrical, three-phase Y-connected armature winding intended to have one of a sinusoidal line voltage and a sine-wave supply current, and another of said parts is provided with a field magnet system, wherein the armature winding and the field magnet system are constructed so that an air-gap magnetic flux linked with the armature winding has a density whose mean value, as determined over an active length of the air gap in a direction perpendicular to a direction of relative movement of the two relatively movable parts, presents a variation along the air gap in said direction of relative movement in accordance with a uniform periodic function:

$f(\alpha,\beta)$, whose positive and negative half-periods are mirror images of each other and whose periods coincide with an extension of two pole pitches of the field magnet system in said direction of relative movement, and which have a form such that within one-half of a positive half period of a function:

$f(\alpha,\beta) = 1$ for $0 \leq \alpha \leq \pi/2$, and $$f(\alpha, \beta) = \frac{\cos(\alpha - \beta) - \sin\beta}{1 - \sin\beta} \text{ for } \beta < \alpha \leq \pi/2,$$

where $\alpha$ is the extension along the air gap in said direction of relative movement and varies from 0 to $\pi/2$ over said one-half of said half-period of the function, and $\beta$ is a constant not greater than about $0.22\pi$.

2. A synchronous machine according to claim 1, wherein $\beta$ is about $\pi/6$.

3. A synchronous machine according to claim 1 having one of salient permanent-magnets and electromagnetic coil-carrying field poles and an armature winding having active parts extending substantially perpendicular in relation to said direction of relative movement, wherein a distance between ferromagnetic cores of the two relatively movable parts varies in said direction of relative movement substantially in agreement with said uniform periodic function.

4. A synchronous machine according to claim 1 having permanent magnetic field poles and an armature winding having active parts extending substantially perpendicular to said direction of relative movement, wherein a thickness of permanent magnets (3) of the field magnet system varies in said direction of relative movement, substantially in agreement with said uniform periodic function.

5. A synchronous machine according to claim 1, having permanent magnetic field poles (3) wherein, active parts (4) of the armature winding extend obliquely in relation to said direction of relative movement; permanent magnets have side edges which are perpendicular to said direction of relative movement; and each permanent magnet field pole has in said direction of relative movement an extension which is smaller than a pole pitch, to obtain a pole gap (7) between mutually adjacent permanent magnet field poles.

6. A synchronous machine according to claim 5, wherein each permanent magnet field pole has in said direction of relative movement an extension of about 147.6° electrical at a pole pitch corresponding to 180° electrical.

7. A synchronous machine according to claim 5, the permanent field poles are displaced in said direction of relative movement alternately in one and another direction relative to positions corresponding to uniform distribution of the field poles in said direction, such that gap between mutually adjacent permanent magnet field poles (3) will have alternately different sizes in said direction of relative movement.

8. A synchronous machine according to claim 1 having salient electromagnetic field poles provided with pole shoes which face towards said air gap, wherein active parts of the armature winding extend perpendicularly to said direction of relative movement; and in that the pole shoes of the field poles have side edges which extend obliquely relative to said direction of relative movement, such that the pole shoes have a substantially rhomboidal shape.

9. A synchronous machine according to claim 8, wherein an extension of the pole shoes in said direction of relative movement is smaller than a pole pitch.

10. A synchronous machine according to claim 9, wherein acute-angle corners of the pole shoes are bevelled.

11. A synchronous machine according to claim 1 in which the field magnet system comprises a distributed field winding arranged on a ferromagnetic core, and in which an air gap distance between ferromagnetic cores of the two parts is constant, wherein a field winding has a current density which varies substantially in proportion to a derivative of said uniform periodic function in said direction of relative movement.

* * * * *